J. S. Sandt,
Drying Hops.
Nº 78,485. Patented June 2, 1868.
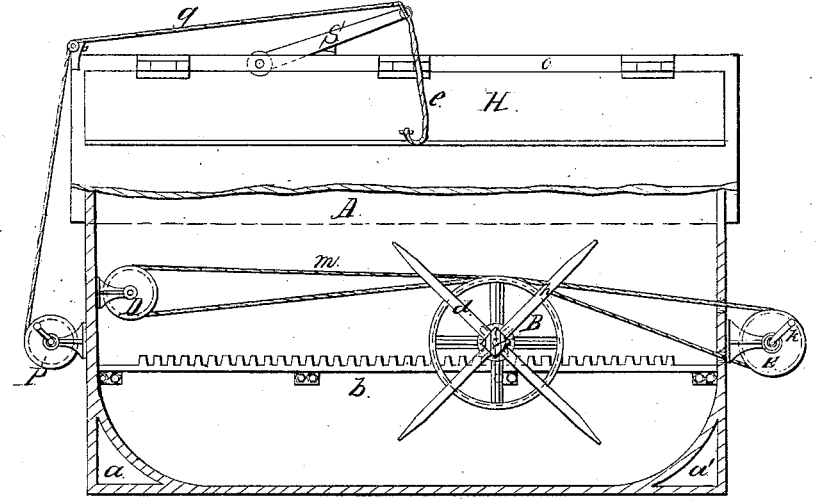
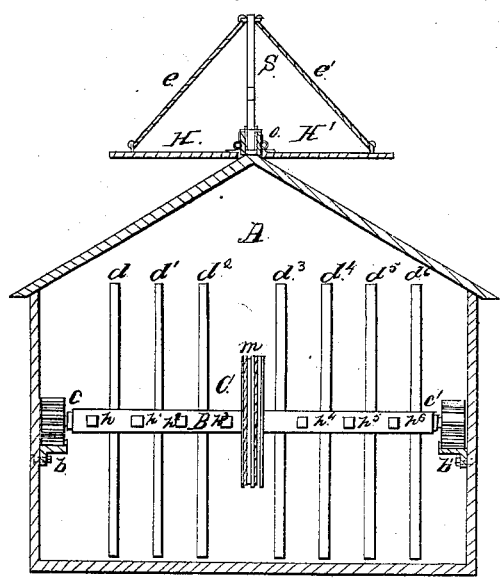
Witnesses:
J. Soleta
O. Vallenbigham
Inventor:
J. S. Sandt
pr Boyd & Co
Attys

United States Patent Office.

J. S. SANDT, OF ST. JOSEPH, MISSOURI.

Letters Patent No. 78,485, dated June 2, 1868.

IMPROVED APPARATUS FOR CURING HOPS.

The Schedule referred to in these Letters Patent and making part of the same.

TO ALL WHOM IT MAY CONCERN:

Be it known that I, J. S. SANDT, of St. Joseph, in the county of Buchanan, and State of Missouri, have invented a new and useful Improved Apparatus for Curing Hops, of which the following is a full, clear, and exact description, reference being had to the annexed drawing, making a part of this specification, in which—

Figure 1 represents a longitudinal sectional elevation of my invention.

Figure 2 represents a transverse sectional elevation of same.

Similar letters indicate like parts.

The object of my invention is to produce a drying or curing-house, which may be easily and perfectly ventilated, and in which the hops, while curing, may be thoroughly stirred from the outside of the house.

Taking a curing-house, A, figs. 1, 2, constructed in the ordinary way, I make the floor and ends unite in a curve, as shown at $a\ a'$, fig. 1; then along the middle of the sides I arrange two racks $b$, fig. 1, $b\ b'$, fig. 2, one on each side, and extending within a short distance of either end of the house. A shaft, B, figs. 1, 2, having on either end a pinion, $c\ c'$, fig. 2, is made of sufficient length to rest on these racks. Midway between the pinions a double-grooved driving-wheel, C, figs. 1, 2, is keyed to the shaft. From this shaft extends a series of radial arms, $d$, fig. 1, $d\ d^1\ d^2$, &c., fig. 2, passing through the same at right angles, to a second series of arms, $h$, fig. 1, $h\ h^1\ h^2$, &c., fig. 2, also passing through the shaft. These arms are made just short enough to escape the floor when set in motion.

A pulley, D, fig. 1, is fixed to one end of the house, on the inside, and a small wheel, E, provided with a crank, $k$, is placed on the outside of the house, at the end opposite D, D being nearly on a line with the top of C, while E is in the line of the shaft B.

An endless rope, $m$, is passed twice round the wheels C and E, and through the pulley D, in such a manner that, by turning the crank, $k$, the pinions may be made to travel on the racks from one end of the house to the other, as desired.

To either side of the ridge-pole $o$, figs. 1, 2, ventilators H, fig. 1, H H', fig. 2, are fixed, being made to cover corresponding openings in the roof.

A lever, S, figs. 1, 2, pivoted in the ridge-pole at $t$, and connected by ropes $e$, fig. 1, $e\ e'$, fig. 2, with the ventilators, and by a rope, $g$, passing over the pulley $p$, on the end of the ridge-pole, with a crank-wheel, P, on the end of the house, serves to raise the ventilators, which are heavy enough to fall by their own weight.

The ventilators being closed, as seen in fig. 1, and the hops placed in the house by a door conveniently arranged, not shown, if the heat becomes too great, they may be easily raised till they assume the position shown in fig. 2. By turning the crank, $k$, the shaft and its arms are made to travel back and forth, continually stirring the hops, without requiring the operator to enter the room, and more effectually than it could be done by hand, since, by reason of the curving sides of the house, no portion of them is out of reach of the arms.

By the use of this apparatus, two things, most essential to a proper curing of hops, are obtained, namely, complete control over the temperature of the house, and a thorough and continual stirring of the hops while drying.

What I claim as my invention, and desire to secure by Letters Patent, is—

1. The ventilators H H', lever S, ropes $e\ e'$ and $g$, pulley $p$, and wheel P of a hop-curing house, all arranged, in relation to each other, substantially as and for the purpose specified.

2. The racks $b\ b'$, shaft B, with its pinions $c\ c^1$, driving-wheel C, with its radial arms $d\ d^1\ d^2$, &c., $h\ h^1\ h^2$, &c., pulley D, wheel E, and endless rope $m$, of a hop-curing house, all arranged, relatively to each other, substantially as and for the purpose specified.

3. A hop-curing house, combining the above-specified devices, all arranged substantially as and for the purpose specified.

J. S. SANDT.

Witnesses:
E. C. ZIMMERMAN,
RUFUS COLBY.